(12) United States Patent
Singh

(10) Patent No.: US 9,661,127 B1
(45) Date of Patent: May 23, 2017

(54) LOCKING-OUT A DRIVER HANDHELD MOBILE DEVICE DURING DRIVING OF A VEHICLE FOR TEXTING AND BROWSING

(71) Applicant: Sanjeev Kumar Singh, Alpharetta, GA (US)

(72) Inventor: Sanjeev Kumar Singh, Alpharetta, GA (US)

(*) Notice: Subject to any disclaimer, the term of this patent is extended or adjusted under 35 U.S.C. 154(b) by 0 days.

(21) Appl. No.: 15/234,204

(22) Filed: Aug. 11, 2016

Related U.S. Application Data

(60) Provisional application No. 62/370,133, filed on Aug. 2, 2016, provisional application No. 62/370,275, filed on Aug. 3, 2016.

(51) Int. Cl.
| | |
|---|---|
| *H04M 1/00* | (2006.01) |
| *H04M 1/725* | (2006.01) |
| *H04W 4/02* | (2009.01) |
| *H04W 64/00* | (2009.01) |

(52) U.S. Cl.
CPC ....... *H04M 1/72577* (2013.01); *H04W 4/028* (2013.01); *H04W 64/00* (2013.01)

(58) Field of Classification Search
CPC .. H04M 1/72577; H04W 64/00; H04W 4/028
USPC ........... 455/404.2, 412.1–414.2, 418–422.1, 455/456.1–456.3, 456.5–457, 41.1–41.2, 455/552.1
See application file for complete search history.

(56) References Cited

U.S. PATENT DOCUMENTS

| | | | | |
|---|---|---|---|---|
| 6,556,810 B2* | 4/2003 | Suzuki | ............... | H04K 3/415 455/345 |
| 6,687,497 B1* | 2/2004 | Parvulescu | ........... | H04W 48/04 379/39 |
| 6,690,940 B1* | 2/2004 | Brown | ................ | H04M 1/6075 340/438 |
| 7,123,874 B1* | 10/2006 | Brennan | ................ | H04K 3/415 340/5.2 |
| 7,260,390 B1* | 8/2007 | Skinner | ................ | G06F 1/1626 379/201.01 |
| 8,036,715 B2* | 10/2011 | Buck | ................... | H04M 1/6083 381/302 |
| 8,417,268 B1* | 4/2013 | Halferty | ................ | H04W 4/027 455/410 |

(Continued)

*Primary Examiner* — Babar Sarwar
(74) *Attorney, Agent, or Firm* — Sanjeev K. Singh

(57) ABSTRACT

Lock-out mechanisms for driver handheld mobile devices are provided to prevent operation of one or more functions of handheld mobile devices by drivers when operating vehicles based on device location data and device motion data within a vehicle by wirelessly communicating with at least one wireless station access point located inside of the vehicle. The lock-out mechanisms disable the ability of a handheld mobile device to perform certain functions, such as texting or browsing, while one is driving. In one embodiment, a handheld mobile device may provide a lock-out mechanism without requiring any modifications or additions to a vehicle by using a motion analyzer, a mobile device position locator and a lock-out mechanism. In other embodiments, the handheld mobile device may provide a lock-out mechanism with modifications or additions to the vehicle, including the use of wireless signals transmitted by the vehicle or by a wireless station access point disposed within the vehicle.

19 Claims, 17 Drawing Sheets

(56) References Cited

U.S. PATENT DOCUMENTS

| | | | |
|---|---|---|---|
| 9,026,780 B2* | 5/2015 | Ewell, Jr. ............... | H04W 4/027 455/410 |
| 2002/0173301 A1* | 11/2002 | Ikeda ................... | H04W 88/02 455/419 |
| 2005/0239479 A1* | 10/2005 | Bednasz ........... | H04M 1/72572 455/456.1 |
| 2007/0072553 A1* | 3/2007 | Barbera ............ | H04M 1/72577 455/67.11 |
| 2008/0305735 A1* | 12/2008 | Farnsworth ............ | H04K 3/415 455/1 |
| 2012/0231773 A1* | 9/2012 | Lipovski ........... | H04M 1/72552 455/414.1 |
| 2016/0330769 A1* | 11/2016 | Edge .................... | H04W 24/10 |

* cited by examiner

LOCKING-OUT A DRIVER HANDHELD MOBILE DEVICE DURING DRIVING OF A VEHICLE FOR TEXTING AND BROWSING

CROSS REFERENCE TO RELATED APPLICATIONS

This application claims the priority benefit of the (i). U.S. Provisional Application Ser. No. 62/370,133 entitled "LOCKING-OUT A DRIVER HANDHELD MOBILE DEVICE DURING DRIVING OF A VEHICLE FOR TEXTING AND BROWSING," filed on Aug. 2, 2016 and (ii). U.S. Provisional Application Ser. No. 62/370,275 entitled "LOCKING-OUT A DRIVER HANDHELD MOBILE DEVICE DURING DRIVING OF A VEHICLE FOR TEXTING AND BROWSING 2," filed on Aug. 3, 2016, the contents of both are hereby incorporated by reference herein in their entirety.

BACKGROUND

1. Field

Aspects of the present invention relates generally to safe operation of handheld mobile devices, and more particularly, to providing a lock-out mechanism to prevent operation of one or more functions of handheld mobile devices by drivers when operating vehicles.

2. Description of the Related Art

When you are driving, how often do you see other drivers checking their phones while behind the wheel? And, be honest, how often do you do it yourself? The problem has gotten so big that highways across the country now regularly warn drivers "Don't text and drive." And 46 states and the District of Columbia have laws banning texting and driving. But the issue isn't just talking and texting anymore. Drivers are on Snapchat, Facebook, Instagram, Twitter, Google Maps, Spotify, YouTube and now "Pokemon Go," the video game that has captured the world's attention and has become the latest concern for distracted-driving advocates.

Judging by the results of a recent survey, we have a long way to go in getting that message out. Brutally Honest: How to keep your teens from texting and driving. Nearly 70% of teens say they use apps while driving, according to a just-released survey of 2,500 high school-age children across the country. When the teens were asked to rank the behaviors they consider the most distracting or dangerous for a teen driver, 29% said driving under the influence of alcohol and 25% said writing or sending a text message. Only 6% said actively looking at or posting to social media is the most distracting or dangerous behavior behind the wheel for a teen driver, according to the survey by Liberty Mutual Insurance and Students Against Destructive Decisions (SADD). In another survey (PDF), this one sponsored by the National Safety Council and focusing on 2,400 drivers of all ages, 74% said they would use Facebook while driving, and 37% said they would use Twitter while behind the wheel, with YouTube (35%) and Instagram (33%) close behind.

Texting while driving has become a major concern of parents, law enforcement, and the general public. An April 2006 study found that 80 percent of auto accidents are caused by distractions such as applying makeup, eating, and text messaging on handheld mobile devices (texting). According to the Liberty Mutual Research Institute for Safety and Students Against Destruction Decisions, teens report that texting is their number one distraction while driving. Teens understand that texting while driving is dangerous, but this is often not enough motivation to end the practice.

New laws are being written to make texting illegal while driving. However, law enforcement officials report that their ability to catch offenders is limited because the texting device can be used out of sight (e.g., on the driver's lap), thus making texting while driving even more dangerous. Texting while driving has become so widespread it is doubtful that law enforcement will have any significant effect on stopping the practice.

Therefore, there is a need for improvements in safe operation of handheld mobile devices by drivers when operating vehicles.

SUMMARY

Briefly described, aspects of the present invention relate to lock-out mechanisms for driver handheld mobile devices. In particular, a lock-out mechanism disables the ability of a handheld mobile device to perform certain functions, such as texting and/or browsing, while one is driving a vehicle. A short-range wireless such as Bluetooth and/or WiFi-based wireless local area network (WLAN) system comprises a motion analyzer to detect whether a vehicle or a handheld mobile device is in motion beyond a predetermined threshold level. The short-range wireless Bluetooth and/or WiFi-based WLAN system further comprises a mobile device position locator configured to determine whether the handheld mobile device is located within a safe operating area of the vehicle based on a wireless signal metric associated with the handheld mobile device using a Bluetooth and/or WLAN station operating as an access point which may be a dongle. The short-range wireless Bluetooth and/or WiFi-based WLAN system further comprises a lock-out mechanism configured to automatically and selectively disable one or more functions of the handheld mobile device based on outputs from the motion analyzer and the mobile device position locator. One of ordinary skill in the art appreciates that such a handheld mobile device position locator and temporarily disabler vehicle system can be configured to be installed in different environments where texting and browsing user communications on a handheld mobile device are used in a vehicular setup when operating vehicles, for example while seating in a driver seat and driving a vehicle using interactive device functions of a handheld mobile device manually by typing in a user interface of the device or scrolling displayed items on a device screen or viewing a website, video or photos. Drivers often use a handheld mobile device for texting, Facebook reading while driving, or they use Twitter while behind the wheel, or watch YouTube and browse Instagram when operating vehicles, risking their life and that of other occupants. The lock-out mechanism disables the ability of a handheld mobile device to perform these functions while one is driving a vehicle and sitting in an unsafe operating area and seamlessly enables them when not driving, meaning not seating in the driver seat but seating in the front passenger seat or rear passenger seats which is a safe operating area.

In accordance with one illustrative embodiment of the present invention, a handheld mobile device is provided. The handheld mobile device comprises a motion analyzer configured to detect whether the handheld mobile device is in motion beyond a predetermined threshold level. The handheld mobile device further comprises a mobile device position locator configured to wirelessly determine whether the handheld mobile device is located within a safe operating area of a vehicle based on location data of the handheld mobile device determined from a wireless signal associated with the handheld mobile device. The handheld mobile device further comprises a lock-out mechanism configured to automatically and selectively disable one or more functions of the handheld mobile device based on outputs from the motion analyzer and the mobile device position locator.

Consistent with another embodiment, a method of locking-out a driver handheld mobile device during driving of a vehicle for texting and browsing is provided. The method comprises detecting using a handheld mobile device whether the handheld mobile device is in motion beyond a predetermined threshold level, determining using the handheld mobile device whether the handheld mobile device is located within a safe operating area of a vehicle based on location data of the handheld mobile device determined from a wireless signal associated with the handheld mobile device and automatically and selectively disabling using the handheld mobile device one or more functions of the handheld mobile device when both the handheld mobile device is detected to be in motion beyond the predetermined threshold level and the handheld mobile device is determined not to be located within the safe operating area of the vehicle.

According to yet another embodiment of the present invention, a wireless in-vehicle mobile device positioning and location system is provided for locking-out a driver handheld mobile device during driving of a vehicle for texting and browsing. The system comprises a motion analyzer configured to detect whether the handheld mobile device is in motion beyond a predetermined threshold level. The system further comprises a mobile device position locator configured to wirelessly determine whether the handheld mobile device is located within a safe operating area or an unsafe operating area of a vehicle based on location data of the handheld mobile device determined from a wireless signal associated with the handheld mobile device. The system further comprises a lock-out mechanism configured to automatically and selectively disable one or more functions of the handheld mobile device if determined to be in the unsafe operating area or enable the one or more functions of the handheld mobile device if determined to be in the safe operating area based on outputs from the motion analyzer and the mobile device position locator.

DETAILED DESCRIPTION

To facilitate an understanding of embodiments, principles, and features of the present invention, they are explained hereinafter with reference to implementation in illustrative embodiments. In particular, they are described in the context of a short-range wireless, e.g., Bluetooth and/or WiFi-based WLAN system that comprises a wireless in-vehicle mobile device positioning and location system that monitors and detects a handheld mobile device for taking driver safety-related actions by automatically, selectively and temporarily blocking certain device functions on the handheld mobile device based on its location in a vehicle and motion. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Embodiments of the invention relate to disabling the ability of a handheld mobile device to perform certain functions, such as texting, while one is driving. An opportunity exists for handheld mobile device makers to put into place a lock-out mechanism to disable the input and, possibly, the reception of text messages while the user is driving. The achievement of such a mechanism may be a significant selling point in the eyes of concerned parents, and it could lead to legislation that would require all handheld mobile devices to disable texting while driving.

Although some embodiments of this invention may be described and illustrated herein in terms of a lock-out mechanism to disable text messaging, it should be understood that embodiments of this invention are not so limited, but are generally applicable to disabling any function of a handheld mobile device that may interfere with the safe operation of a vehicle by a driver, such as receiving or placing cellular telephone calls without a hands-free device, for example. Further, although some embodiments of this invention may be described and illustrated herein in the context of an automobile, it should be understood that embodiments of this invention are not so limited, but are generally applicable to any vehicle, such as trains or airplanes, for example.

Figure 1:
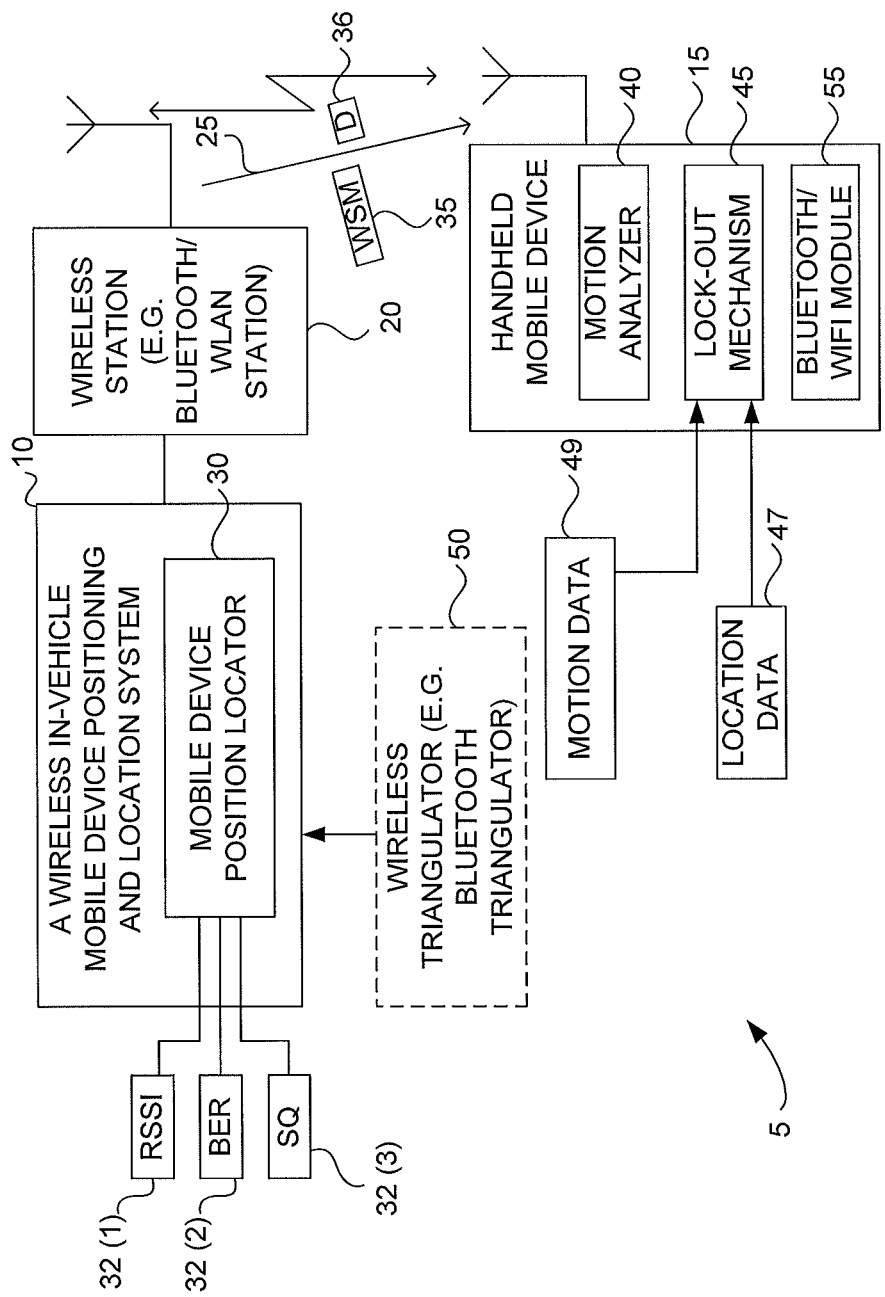
FIG. 1 illustrates a schematic of a short-range wireless, e.g., Bluetooth and/or WiFi-based WLAN system that comprises a wireless in-vehicle mobile device positioning and location system that monitors and detects a handheld mobile device for taking driver safety-related actions by automatically, selectively and temporarily blocking certain device functions on the handheld mobile device based on its location in a vehicle and motion in accordance with an exemplary embodiment of the present invention.

FIG. 1 illustrates a schematic of a short-range wireless, e.g., Bluetooth and/or WiFi-based WLAN system 5 that comprises a wireless in-vehicle mobile device positioning and location system 10 that monitors and detects a handheld mobile device 15 for taking driver safety-related actions by automatically, selectively and temporarily blocking certain device functions on the handheld mobile device 15 based on its location in a vehicle and motion in accordance with an exemplary embodiment of the present invention. The wireless in-vehicle mobile device positioning and location system 10 includes a wireless station 20 such as a Bluetooth station or a WLAN station capable of operating as an access point. The wireless station 20 transmits a wireless beacon 25 to the handheld mobile device 15. The handheld mobile device 15 either by itself if having a mobile device position locator 30 measures a wireless signal metric (WSM) 35 such as a Radio Signal Strength Indicator (RSSI) 32(1) or a received bit error rate (BER) 32(2) and a signal quality (SQ) 32(3) of the wireless beacon 25. The wireless signal metric (WSM) 35 may be mapped to a distance (D) 36 between the handheld mobile device 15 and the wireless station 20.

Alternatively, the wireless in-vehicle mobile device positioning and location system 10 includes the mobile device position locator 30 and performs this function. Consistent with one embodiment, for example, the mobile device position locator 30 may be configured to determine whether the handheld mobile device 15 is located within a safe operating area of the vehicle based on a wireless Bluetooth-based system, a WLAN-based system, or a Bluetooth-WLAN combo based system having at least one of metric such as the Radio Signal Strength Indicator (RSSI) 32(1) or the received bit error rate (BER) 32(2) and the signal quality (SQ) 32(3) associated with the handheld mobile device 15.

The handheld mobile device 15 may include a motion analyzer 40 configured to detect whether a vehicle or the handheld mobile device 15 is in motion beyond a predetermined threshold level. The handheld mobile device 15 further includes a lock-out mechanism 45 configured to automatically and selectively disable one or more functions of the handheld mobile device 15 based on outputs from the motion analyzer 40 and the mobile device position locator 30. In particular, the distance (D) 36 of the handheld mobile device 15 may be used as location data 47 by the lock-out mechanism 45 to control functionality of the handheld mobile device 15. The motion analyzer 40 may provide motion data 49 such as GPS data of the handheld mobile device 15 to the lock-out mechanism 45.

In particular, the lock-out mechanism 45 may enable the ability of the handheld mobile device 15 to perform certain functions, such as texting or browsing, while one is not driving or not in the driver's seat being in the safe operating area based on the location data 47 and the motion data 49. The lock-out mechanism 45 may use this location data 47 and the motion data 49 to disable the ability of the handheld mobile device 15 to perform certain functions, such as texting or browsing, while one is driving or in the driver's seat being in the unsafe operating area.

The motion analyzer 40 may be located in a vehicle or in the handheld mobile device 15. The mobile device position locator 30 likewise may be located in the vehicle or in the handheld mobile device 15. The lock-out mechanism 45 likewise may be located in the vehicle or in the handheld mobile device 15.

The mobile device position locator 30 includes one or more Bluetooth stations and/or WLAN stations such as the wireless station 20, which may be access points configured to communicate with the handheld mobile device 15 to determine a location of it in the vehicle in terms of being in a safe operating area or in an unsafe operating area. The mobile device position locator 30 may measure the Radio Signal Strength Indicator (RSSI) 32(1), the received bit error rate (BER) 32(2) and the signal quality (SQ) 32(3) associated with the handheld mobile device 15. These parameters: the Radio Signal Strength Indicator (RSSI) 32(1), the received bit error rate (BER) 32(2) and/or the signal quality (SQ) 32(3) associated with the handheld mobile device 15 are mapped to the distance (D) 36 from a driver's seat of the handheld mobile device 15. For example, a 0.5 meter or 1-2 feet away from the driver's seat is considered safe as the handheld mobile device 15 is determined to be in the safe operating area. The lock-out mechanism 45 enables the ability of the handheld mobile device 15 to perform certain functions, such as texting or browsing, while one is not driving or not in the driver's seat being in the safe operating area. The lock-out mechanism 45 disables the ability of the handheld mobile device 15 to perform certain functions, such as texting or browsing, while one is driving or in the driver's seat being in the unsafe operating area.

The wireless in-vehicle mobile device positioning and location system 10 may be implemented in a Bluetooth-capable handheld mobile device such as the handheld mobile device 15. A range estimation of the wireless in-vehicle mobile device positioning and location system 10 is based on an approximation of the relationship between the RSSI (Radio Signal Strength Indicator) 32(1) and the associated distance (D) 36 between a sender and a receiver. The actual location estimation may be carried out by using a triangulation technique. The implementation of the wireless in-vehicle mobile device positioning and location system 10 in the Bluetooth-capable handheld mobile device 15 may be realized by using the Software Microsoft eMbedded Visual C++ Version 3.0. Furthermore, automatic handover procedures based on a user mobile terminal location provide a quality of service in a wireless network. The wireless in-vehicle mobile device positioning and location system 10 is based on the Bluetooth specification developed by the SIG (Special Interest Group) and it presents a technology suitable for in-vehicle application.

The Bluetooth-capable handheld mobile device 15 position estimation may occur in the handheld mobile device 15 without the need of changes in the already fixed installed network topology. The wireless in-vehicle mobile device positioning and location system 10 is based on the known triangulation techniques using the received signal power strength based on the RSSI (Radio Signal Strength Indicator) 32(1) of one or more surrounding Bluetooth stations such as the wireless station 20 operating as access points. For a precise position estimation of the handheld mobile device 15 in the vehicle, the dependence between a distance between the handheld mobile device 15 and a surrounding Bluetooth station such as the wireless station 20 and a received signal strength of the wireless beacon 25 at the handheld mobile device 15 from the surrounding Bluetooth station such as the wireless station 20 is determined. Therefore, the distances are estimated by an approximation of the Received Signal Strength Indicator (RSSI) 32(1).

The mobile device position locator 30 in the Bluetooth-capable handheld mobile device 15 or in the vehicle may provide an interface to extract a real received signal strength of the wireless beacon 25 for using a RSSI value 32(1) to derive a range estimation between an access point such as the surrounding Bluetooth station such as the wireless station 20 and the Bluetooth-capable handheld mobile device 15. If the Bluetooth-capable handheld mobile device 15 does not provide any interface to extract the real received signal strength, the wireless in-vehicle mobile device positioning and location system 10 may use the RSSI value 32(1) provided as defined in the standard in order to derive a range estimation between an access point and a mobile terminal. The position estimation may be based on signal strengths using LSE (least squares estimation) and RSSI measurements which may be converted to a distance between a sender and a receiver such as the handheld mobile device 15 and a surrounding Bluetooth station such as the wireless station 20.

The mobile device position locator 30 may calculate a position of the Bluetooth-capable handheld mobile device 15 based on the distance between the Bluetooth-capable handheld mobile device 15 and at least three different Bluetooth stations such as the wireless station 20. The single distances can be determined by the functional correlation to the received signal strength of the wireless beacon 25.

The mobile device position locator 30 may convert the received signal strength measurement such as the RSSI value 32(1) to distances (ds) 36 between a sender and a receiver. The mobile device position locator 30 may approximate the correlation between the received signal strength and the distance (D) 36 based on RSSI measurements in order to obtain position estimation of the Bluetooth-capable handheld mobile device 15 in the vehicle. If a Bluetooth Specification does not provide a possibility to extract the received signal strength in a direct way, the value of the RSSI 32(1) defined by the Bluetooth protocol may be used by the mobile device position locator 30 to get a correlation to the distance between a sender and a receiver in the wireless network.

The Bluetooth wireless RF standard has been established as one of the most prevalent protocols implemented for wireless personal area networks. Its relatively low power consumption compared to implementations such as 802.11 make it suited for a variety of short range applications suitable for small embedded devices. The cell phone market has been a huge catalyst in making the Bluetooth protocol mainstream, as the majority of mobile phones now feature Bluetooth connectivity. As Bluetooth enabled devices become a part of our wireless world, there is increased interest in locating and communicating with other Bluetooth devices within a local network. While basic discovery of surrounding Bluetooth devices is already possible, the mobile device position locator 30 may use a Bluetooth service to triangulate the location of surrounding Bluetooth devices such as the handheld mobile device 15.

The wireless in-vehicle mobile device positioning and location system 10 may optionally include a wireless triangulator 50 such as a Bluetooth triangulator for use according to one embodiment of the present invention. The wireless triangulator 50 combining hardware and software allows Bluetooth devices to communicate with each other and determine the position of other Bluetooth devices using signal strength readings. This type of a Bluetooth service is useful as a device location utility. The wireless triangulator 50 may dynamically measure and report the distances to surrounding Bluetooth devices. To this end, the handheld mobile device 15 includes a Bluetooth/WiFi module 55.

Figure 2:
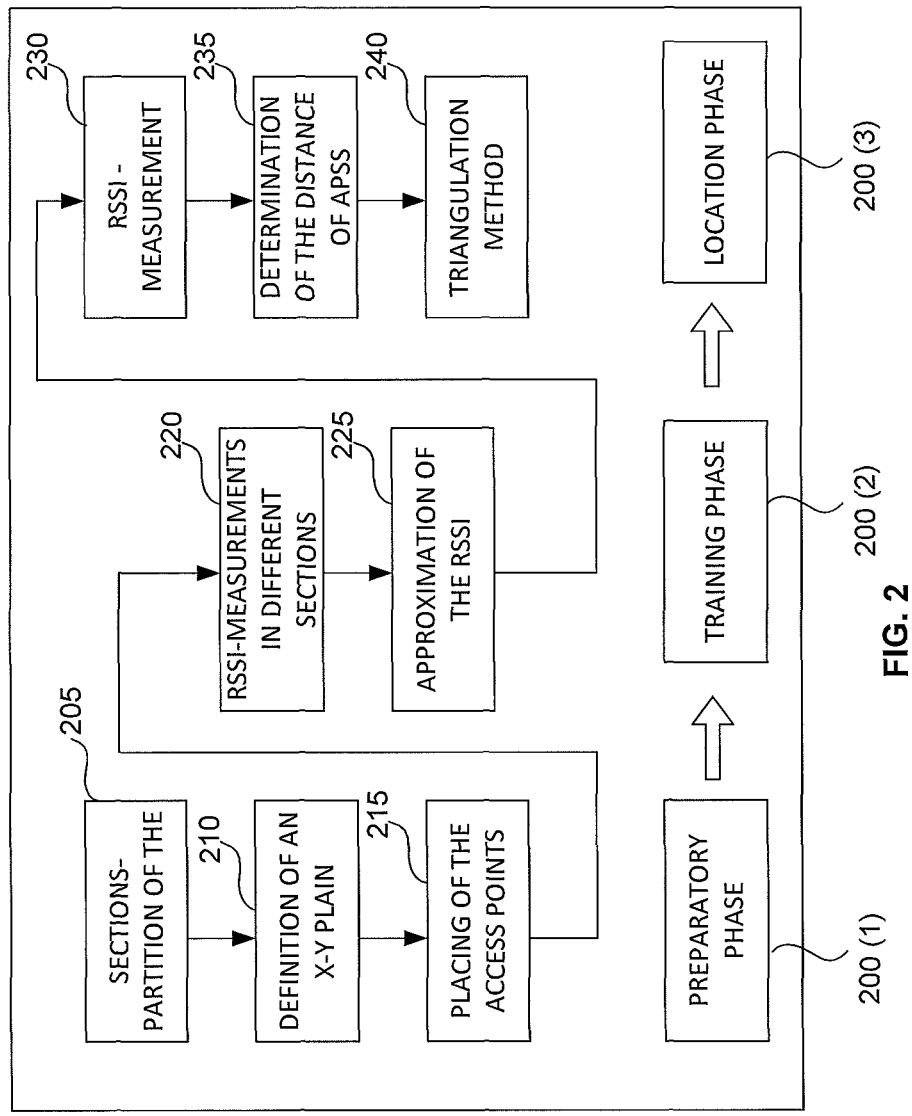
FIG. 2 illustrates a flow chart of an overview of the operation breakdown of the wireless in-vehicle mobile device positioning and location system of FIG. 1 as illustrated by three sequences according to one embodiment of the invention.

Referring to FIG. 2, it illustrates a flow chart of an overview of the operation breakdown of the wireless in-vehicle mobile device positioning and location system 10 of FIG. 1 as illustrated by three sequences according to one embodiment of the invention. Reference is made to the elements and features described in FIG. 1. It should be appreciated that some steps are not required to be performed in any particular order, and that some steps are optional.

The wireless in-vehicle mobile device positioning and location system 10 provides a user interface which is subdivided in three sequences 200(1-3). First, in a preparatory phase 200(1) the considered indoor vehicle area is covered by a defined x-y plain, in a second phase called a training phase 200(2) the RSSI function which is fitting the environmental conditions is approximated. In the last phase called a location phase 200(3) the mobile device position locator 30 software uses a location method described above in order to determine the position estimation of the Bluetooth-capable handheld mobile device 15 based on RSSI 32(1) measurements. The mobile device position locator 30 may use a triangulation technique by applying known mathematical calculations on the RSSI value 32(1) of three surrounding Bluetooth stations such as the wireless station 20 acting as access points.

In the preparatory phase 200(1), at step 205 sections are formed by partition of the vehicle interior area. At step 210, a definition of an x-y plain for the vehicle interior area is created. Then, Bluetooth stations such as the wireless station 20 acting as access point may be placed in the vehicle interior area at step 215.

In the training phase 200(2), at step 220, RSSI measurements in different sections are taken by the mobile device position locator 30. In one embodiment, for example, the mobile device position locator 30 extracts a value of the RSSI 32(1) by using the HCI instructions, HCI_Read_RSSI of the Bluetooth Specification. The accuracy of this value is not standardized and depends on the Bluetooth hardware manufacturer. At step 225, approximation of the RSSI is obtained by the mobile device position locator 30.

In the location phase 200(3), at step 230 an actual real-time RSSI measurement is taken of the wireless beacon 25 by the mobile device position locator 30 either located in the vehicle or on the handheld mobile device 15. Next based on the RSSI measurement, a determination of distances (ds) to Bluetooth stations such as the wireless station 20 acting as access points is made at step 235. In step 240, a triangulation method may be used to determine an exact location or position of the handheld mobile device 15 in the vehicle.

Figure 3:
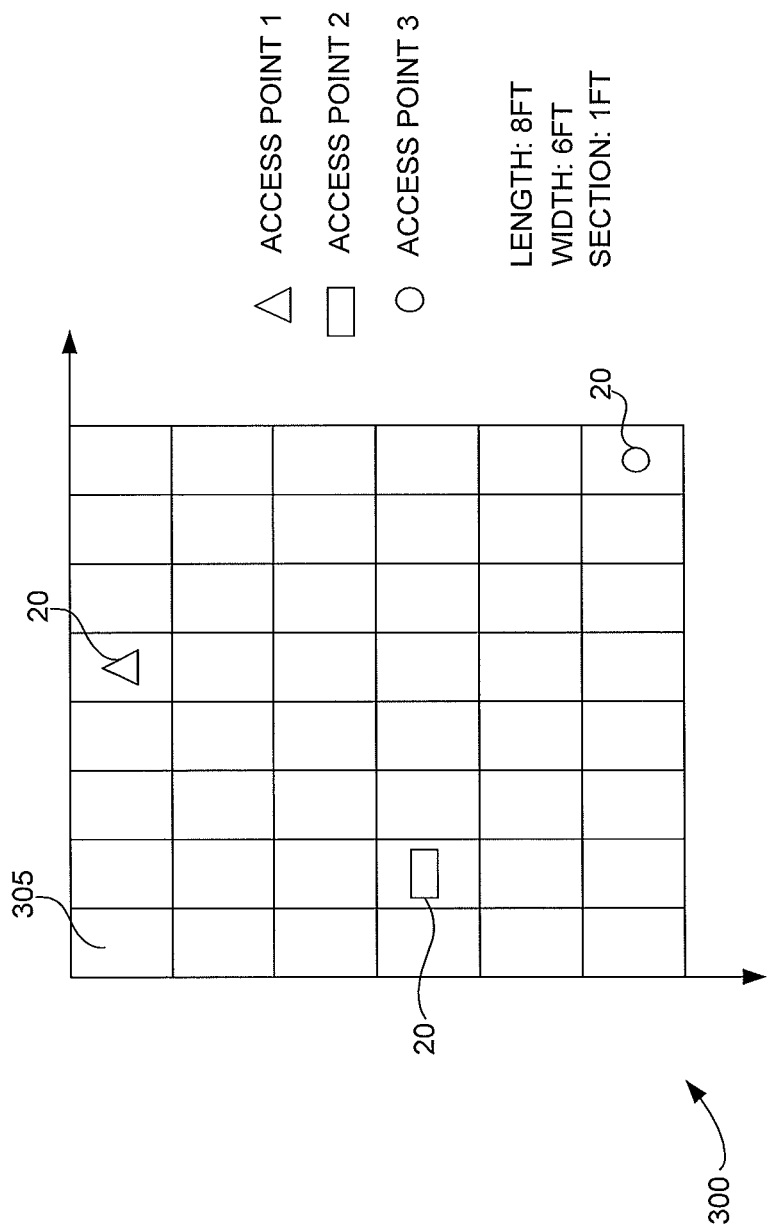
FIG. 3 illustrates a definition of an x-y plain of a vehicle interior room of 8 ft×6 ft by the wireless in-vehicle mobile device positioning and location system of FIG. 1 according to one embodiment of the invention.

FIG. 3 illustrates a definition of an x-y plain of a vehicle interior room of 8 ft×6 ft by the wireless in-vehicle mobile device positioning and location system of FIG. 1 according to one embodiment of the invention. The Bluetooth stations such as the wireless station 20 acting as access points may be realized by Bluetooth-modules BT-DG02 of the company EpoX. The Bluetooth stations such as the wireless station 20 acting as access points may be distributed in a vehicle interior room 300. The vehicle interior room may be portioned in 1 ft×1 ft sections 305 or squares. The vehicle interior room 300 of 8 ft×6 ft size is illustrated in FIG. 3.

To obtain a good approximation function between the RSSI and the Bluetooth station such as the wireless station 20 acting as an access point distances in a number of randomly chosen sections several measurements may be recorded by the mobile device position locator 30. The mean of all RSSI 32(1) measurements belonging to one section and the Bluetooth station such as the wireless station 20 acting as an access point may form the reference values of the RSSI in a section 305. In one scenario, the RSSI value 32(1) of all Bluetooth stations such as the wireless station 20 acting as access points may be best fitted by a polynomial function of the order 3.

In this way, the wireless in-vehicle mobile device positioning and location system 10 is based on signal strength measurements, which were approximated by the received RSSI 32(1) in the Bluetooth-capable handheld mobile device 15. In this implementation mobile devices scan the Bluetooth beacons such as the wireless beacon 25 to get distance information by creating a very precise mapping of the vehicle interior room 300 to a spatial grid 310. Using a comprehensive collection of RSSI data across the vehicle interior room 300, a simple distance-RSSI mathematical mapping may be created. RSSI may be used to indicate a distance (D) if the vehicle interior room 300 is well known and empirical data is used to create a precise mapping.

A RSSI-to-distance mapping may be created by the mobile device position locator 30. For example, a TABLE I below shows an exemplary mapping.

TABLE I

| RSSI (dBm) | Distance (feet) |
|---|---|
| 0 | 0 |
| −1 | 1 |
| −2 | 2 |
| −3 | 3 |
| −4 | 4 |
| −5 | 5 |
| −6 | 6 |

However, the accuracy of RSSI measurements are varied due to implementation, device, and environmental limitations. With a more advanced Bluetooth station as Access Point, these issues may be masked by taking redundant RSSI readings across a spectrum of transmit power levels using attenuators. Standardizing RSSI hardware implementations and the expected granularity/accuracy would also benefit Bluetooth location schemes. Perhaps, the next iteration of the Bluetooth protocol could provide some basic interface for positioning information and exchange.

Some hard-coding for the vehicle interior room 300 geometry and Bluetooth station such as the wireless station 20 acting as access point locations may be beneficial to attain accuracy. Multiple high-gain antennas on a Bluetooth station such as the wireless station 20 acting as access point with variable attenuators may produce more accurate results than simple RSSI measurements. The antennas may be placed strategically and the Bluetooth station such as the wireless station 20 acting as access point may record readings from the Bluetooth-enabled handheld mobile devices 15. The Bluetooth station such as the wireless station 20 acting as access point may connect to the Bluetooth-enabled handheld mobile device 15 and, for each of its antennas, record RSSI 32(1) readings while varying the attenuation levels on the antenna. The results are several redundant readings over multiple transmit power levels for increased accuracy. The Bluetooth station such as the wireless station 20 acting as access point may overcame the often non-linear correlation between RSSI values 32(1) and distance (D) 36.

A triangulation method combined with least square estimation is used by the mobile device position locator 30 to predict the position of the Bluetooth-capable handheld mobile device 15. The functional dependence between the received RSSI 32(1) and the distance (D) 36 may be obtained by a well fitted polynomial approximation. It is expected that the accuracy of the estimation could be increased by combining the method with the results of other kinds of location estimation. For example, a combination with an inertial system and the development of adequate Kalmann Filter may be beneficial.

Figure 4:
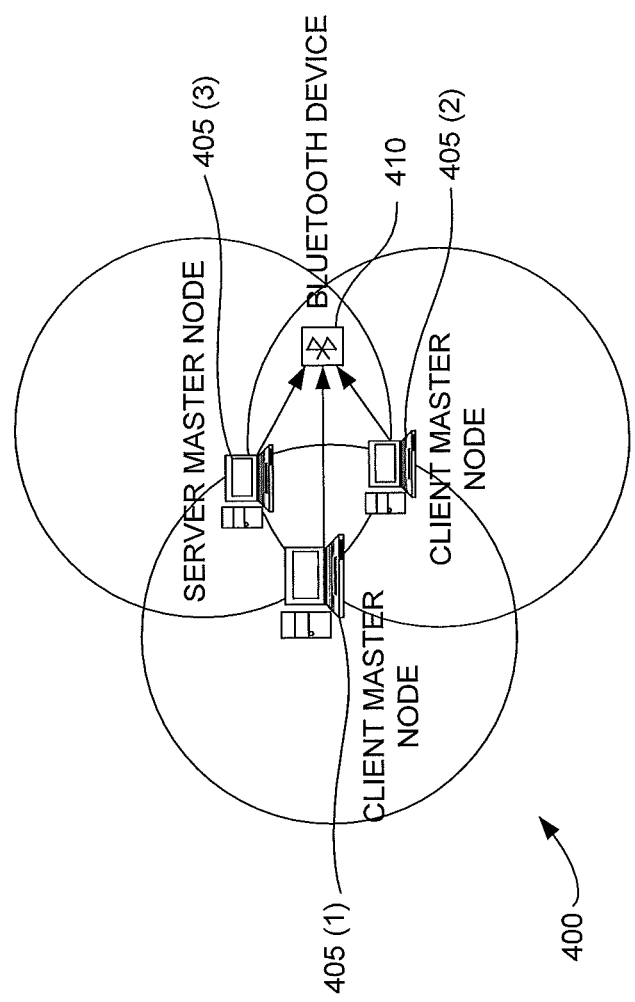
FIG. 4 illustrates a wireless triangulator such as a Bluetooth triangulator for use with the wireless in-vehicle mobile device positioning and location system of FIG. 1 according to one embodiment of the invention.

FIG. 4 illustrates a wireless triangulator 400 such as a Bluetooth triangulator for use with the wireless in-vehicle mobile device positioning and location system 10 of FIG. 1 according to one embodiment of the invention. The wireless triangulator 400 includes 3 master nodes 405(1-3), each collecting RSSI 32(1) measurements from a slave mobile device 410. The 3 master nodes 405(1-3) may be a Bluetooth station as access point which may be Bluetooth dongles configured to do Bluetooth Triangulation. The Bluetooth discovery process does not guarantee to find all the surrounding Bluetooth devices even if the device is in range. To tackle this issue, the mobile device position locator 30 can perform the discovery multiple times or increase the discovery period to reduce the possibility that any Bluetooth device in range is left undiscovered. RSSI measurements can fluctuate greatly for a given mobile device even when it is stationary. The RSSI-distance mapping may not necessarily be fully linear.

One of the 3 master nodes 405(1-3) acts as a server 405(3) that will collect measurements from the two client master nodes 405(1-2). The server master node 405(3) may be running on a server-type developer board, while the two client master nodes 405(1-2) will both run on a common desktop-type board. All machines may use the Linux 2.6.9 kernel which has been compiled with the optional Bluetooth networking stack. In addition, all master nodes may rely on the BlueZ package for Bluetooth libraries and utilities.

Before sending a message packet to the server master node 405(3), a client master node 405(1-2) will collect the RSSI readings four times for each discovered Bluetooth device 410. Then, the slave will pack the message packet as shown below and send it to the host for further processing. The reason to have multiple RSSI readings is two-fold. First of all, RSSI 32(1) reading tends to fluctuate greatly. Multiple sampling points can be used to normalize the fluctuation. Secondly, instead of sending a message packet each time a RSSI read is executed, one packet containing multiple RSSI readings for all known devices greatly reduces network overhead.

The server master node 405(3) will also perform the RSSI 32(1) readings for all devices it can discover while also waiting for incoming message packets from the two client master nodes 405(1-2). Upon receiving incoming packets, the server node will process the information and look for RSSI readings for matching devices it already knows about. For devices with RSSI readings by all 3 master nodes 405(1-3), the server will proceed to calculate the approximate distance to the mobile device 410 and provide the results.

The Bluetooth logical link control and adaptation protocol (L2CAP) may be used to exchange information between 3 master nodes 405(1-3). L2CAP is used within the Bluetooth protocol stack. It passes packets to either the Host Controller Interface (HCI) or on a host-less system, directly to the ACL/ASB/PSB link. L2CAP's functions include: Transporting data for higher layer protocols, including multiplexing multiple applications over a single link. The Bluetooth logical link control and adaptation protocol (L2CAP) supports higher-level protocol multiplexing, packet segmentation and reassembly, and the conveying of quality of service information. Each master node 3 master nodes 405(1-3) may collect discovery results, connect to discovered devices, and obtain redundant RSSI readings. For the client master nodes 405(1-2), this information may be packed and sent to the server master node 405(3) for processing.

Once received by the server master node 405(3), the information may be processed and distances (ds) inferred for the Bluetooth device 410. Using several empirical data points a simple mapping between RSSI and distance (D) may be established for the vehicle interior room 300.

By placing the dongles in an 'L' shaped triangle, a simple trilateration scheme may be used to predict the co-ordinates and distance from the origin. While RSSI 32(1) did not have a linear mapping to distance, enough empirical data may be collected to make a direct mapping. This results in accuracy within +/− few feet. RSSI may be used to indicate what 'zone' a device is in, rather than pinpointing a single co-ordinate.

Figure 5:
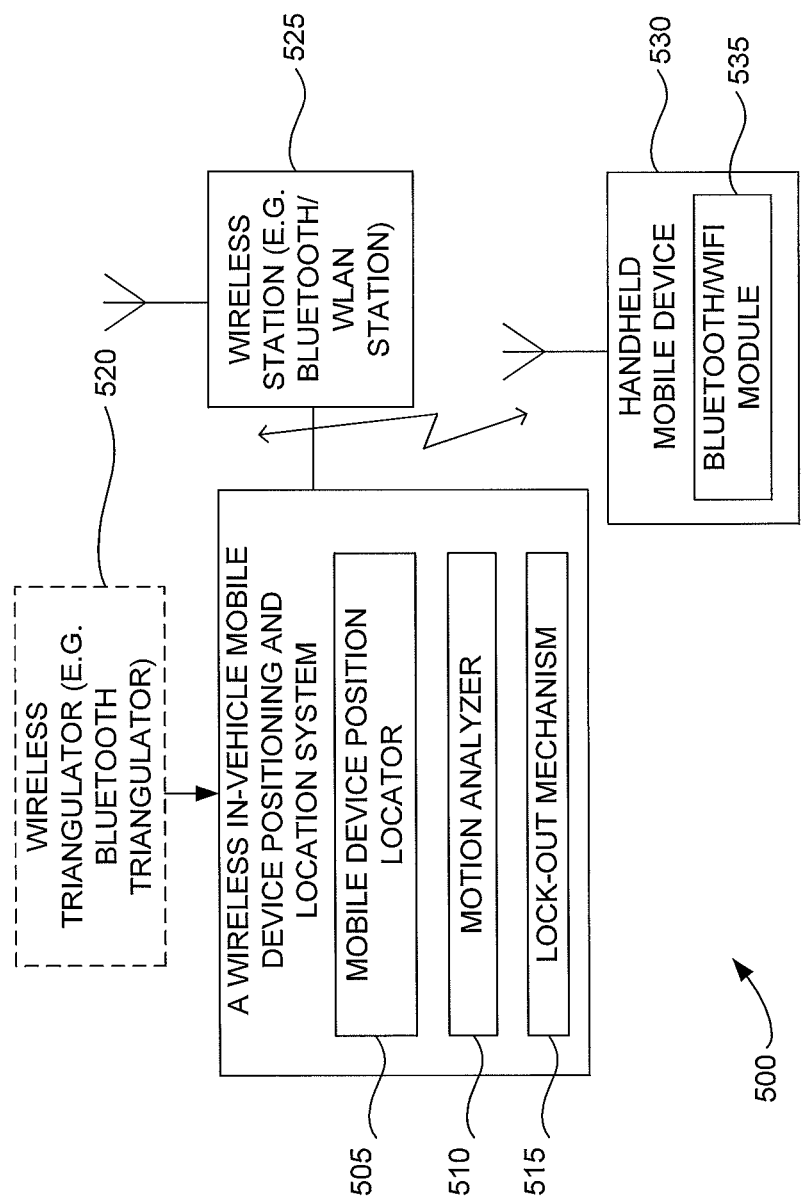
FIG. 5 illustrates a schematic of a short-range wireless, e.g., Bluetooth and/or WiFi-based WLAN system in accordance with another exemplary embodiment of the present invention.

As shown in FIG. 5, it illustrates a schematic of a short-range wireless, e.g., Bluetooth and/or WiFi-based WLAN system 500 in accordance with another exemplary embodiment of the present invention. The short-range wireless, e.g., Bluetooth and/or WiFi-based WLAN system 500 includes a mobile device position locator 505, a motion analyzer 510, a lock-out mechanism 515 and optionally a wireless triangulator 520 (e.g., a Bluetooth triangulator) within a vehicle. The short-range wireless, e.g., Bluetooth and/or WiFi-based WLAN system 500 further includes a wireless station 525 (e.g., Bluetooth/WLAN) within the vehicle to wirelessly communicate with a handheld mobile device 530. To this end, the handheld mobile device 530 includes a Bluetooth/WiFi module 535.

Figure 6:
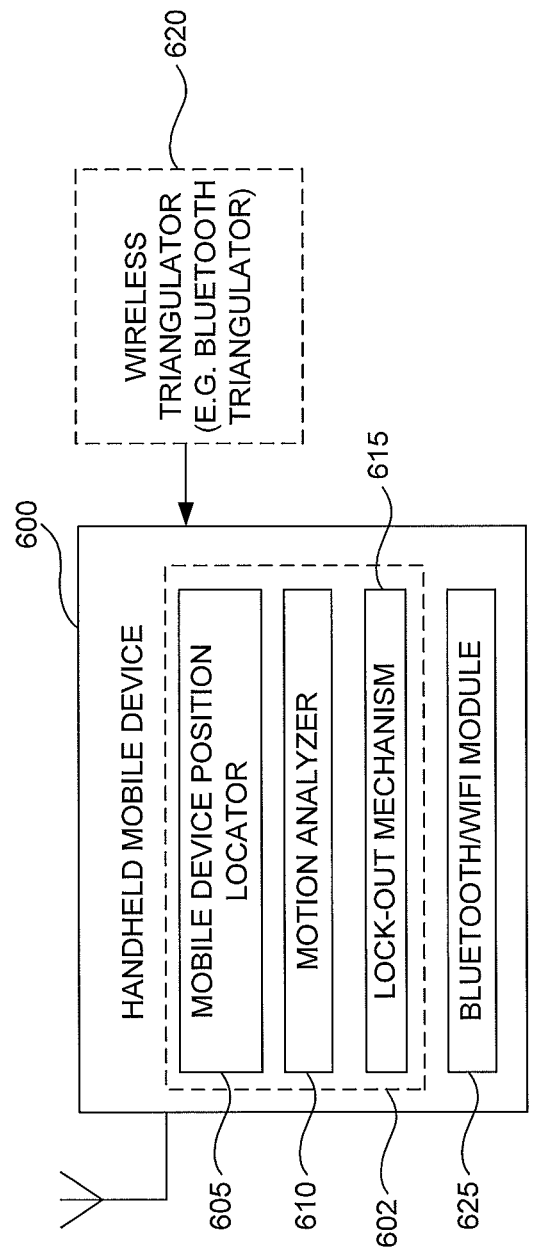
FIG. 6 illustrates a schematic of a handheld mobile device including a short-range wireless, e.g., Bluetooth and/or WiFi-based WLAN system in accordance with yet another exemplary embodiment of the present invention.

As seen in FIG. 6, it illustrates a schematic of a handheld mobile device 600 including a short-range wireless, e.g., Bluetooth and/or WiFi-based WLAN system 602 in accordance with yet another exemplary embodiment of the present invention. The short-range wireless, e.g., Bluetooth and/or WiFi-based WLAN system 602 includes a mobile device position locator 605, a motion analyzer 610, a lock-out mechanism 615 and optionally a wireless triangulator 620 (e.g., a Bluetooth triangulator) within the handheld mobile device 600. The short-range wireless, e.g., Bluetooth and/or WiFi-based WLAN system 602 further includes a wireless station (e.g., Bluetooth/WLAN) within the vehicle to wirelessly communicate with the handheld mobile device 600. To this end, the handheld mobile device 600 includes a Bluetooth/WiFi module 625.

Figure 7:
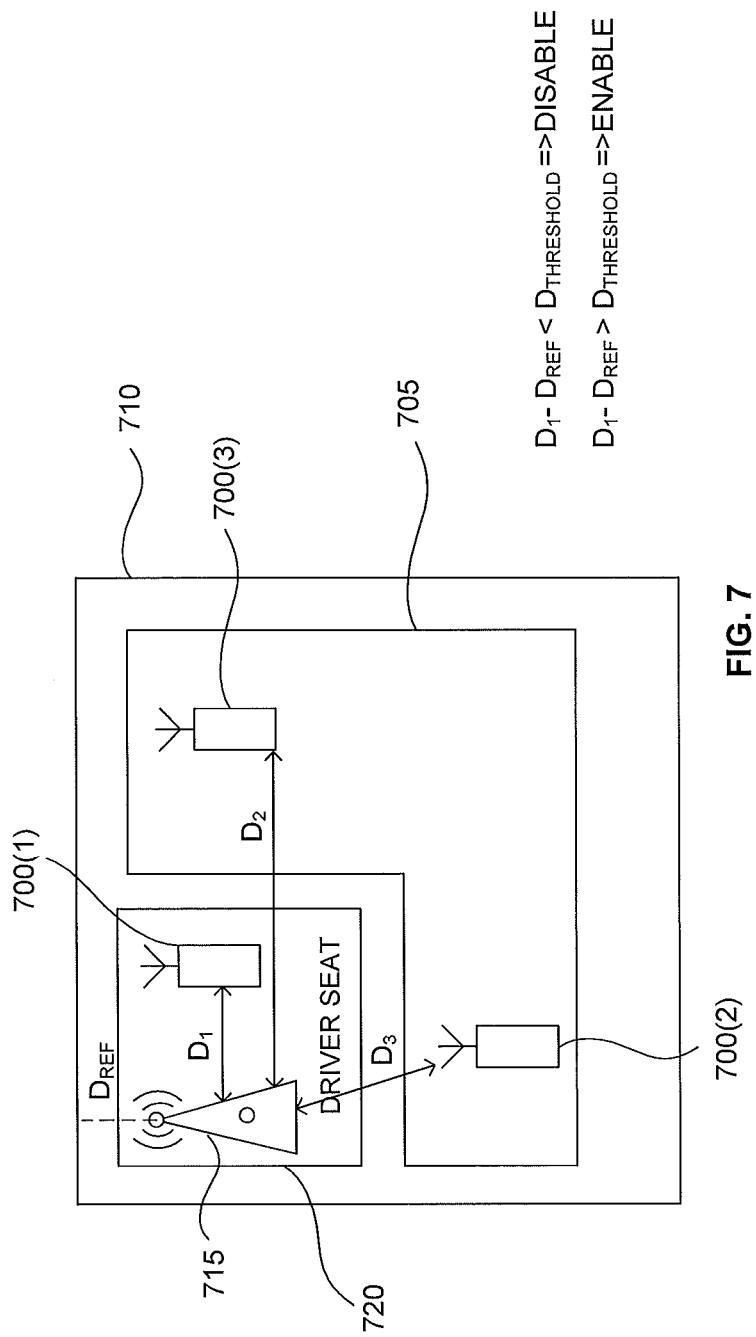
FIG. 7 illustrates a schematic of a mobile device position locator configured to determine whether a handheld mobile device is located within a safe operating area of a vehicle based on a wireless signal metric associated with the handheld mobile device using a WLAN station operating as an access point which may be a dongle in accordance with an exemplary embodiment of the present invention.

In FIG. 7, it illustrates a schematic of a mobile device position locator configured to determine whether handheld mobile devices 700(1-3) are located within a, safe operating area 705 of a vehicle 710 based on a wireless signal metric associated with the handheld mobile devices 700(1-3) using a WLAN station 715 operating as an access point which may be a dongle in accordance with an exemplary embodiment of the present invention. The vehicle 710 may include a driver's seat in an unsafe operating area 720. In FIG. 7, the first handheld mobile device 700(1) is shown in the unsafe operating area 720, the second handheld mobile device 700(2) is shown in the safe operating area 705, and the third handheld mobile device 700(3) is shown in the safe operating area 705.

The driver's seat may be at a location identified as a distance (Dref) with respect to the WLAN station 715 when it is located in the centre of the driver's seat underneath the seat. The mobile device position locator 30 provides a distance (D1) of a first handheld mobile device 700(1), a distance (D2) of a second handheld mobile device 700(2), a distance (D3) of a third handheld mobile device 700(3). The lock-out mechanism 45 may compare the distances D1, D2, D3 to Dref with respect of a threshold distance Dthreshold being indicator of which area in the vehicle a handheld mobile device belongs to. The lock-out mechanism 45 may use the following equations:

$$D1-Dref<Dthreshold \Rightarrow \text{DISABLE device}700(1)$$

$$D1-Dref>Dthreshold \Rightarrow \text{ENABLE device}700(1)$$

Figure 8:
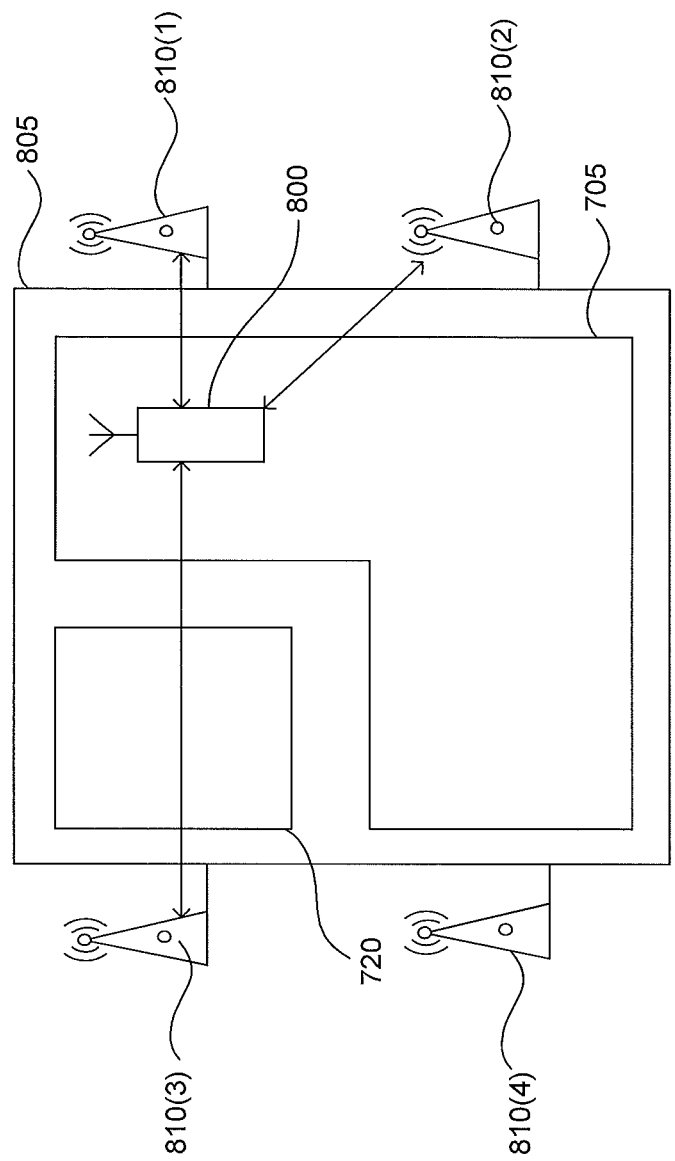
FIG. 8 illustrates a schematic of a WiFi-based WLAN system to detect a location of a handheld mobile device within a vehicle based on a wireless signal metric associated with the handheld mobile device and a triangulation technique using WLAN stations operating as access points in accordance with an exemplary embodiment of the present invention.

With regard to FIG. 8, it illustrates a schematic of a WiFi-based WLAN system to detect a location of a handheld mobile device 800 within a vehicle 805 based on the wireless signal metric (WSM) 35 associated with the handheld mobile device 800 and a triangulation technique using WLAN stations 810(1-3) of 810(1-4) operating as access points in accordance with an exemplary embodiment of the present invention.

Figure 9:
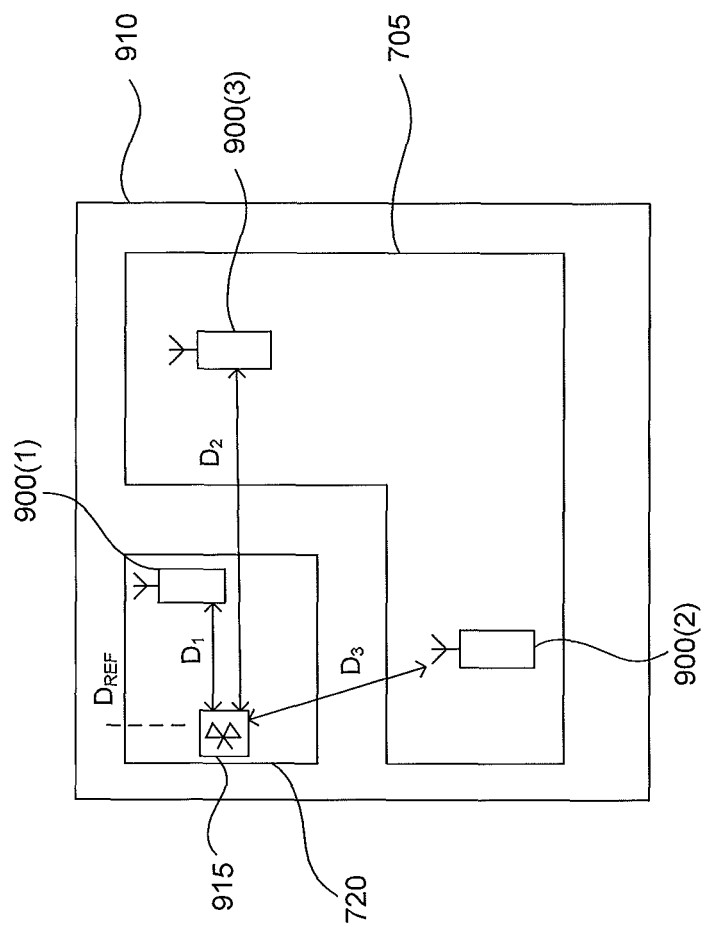
FIG. 9 illustrates a schematic of a mobile device position locator configured to determine whether a handheld mobile device is located within a safe operating area of a vehicle based on a wireless signal metric associated with the handheld mobile device using a short-range wireless Bluetooth station operating as an access point which may be a dongle in accordance with an exemplary embodiment of the present invention.

With respect to FIG. 9, it illustrates a schematic of a mobile device position locator configured to determine whether handheld mobile devices 900(1-3) are located within a safe operating area 905 of a vehicle 910 based on the wireless signal metric (WSM) 35 associated with the handheld mobile devices 900(1-3) using a short-range wireless Bluetooth station 915 operating as an access point which may be a dongle in accordance with an exemplary embodiment of the present invention. Same method as shown in FIG. 7 may be deployed here in this example.

Figure 10:
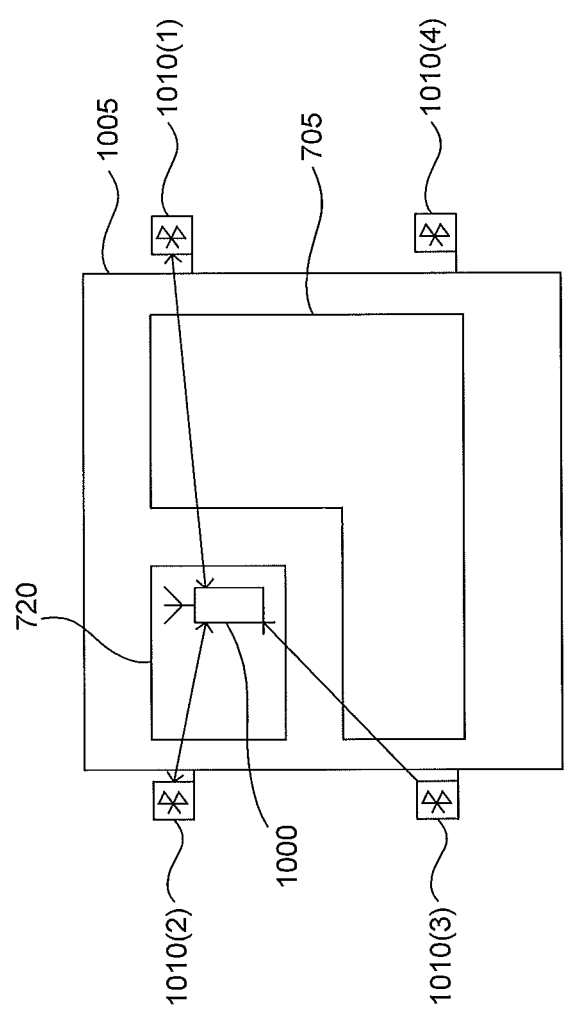
FIG. 10 illustrates a schematic of a short-range wireless Bluetooth system to detect a location of a handheld mobile device within a vehicle based on a wireless signal metric associated with the handheld mobile device and a triangulation technique using short-range wireless Bluetooth stations operating as access points in accordance with an exemplary embodiment of the present invention.

FIG. 10 illustrates a schematic of a short-range wireless Bluetooth system to detect a location of a handheld mobile device 1000 within a vehicle 1005 based on the wireless signal metric (WSM) 35 associated with the handheld mobile device 1000 and a triangulation technique using short-range wireless Bluetooth stations 1010(1-3) of 1010(1-4) operating as access points in accordance with an exemplary embodiment of the present invention.

Figure 11:
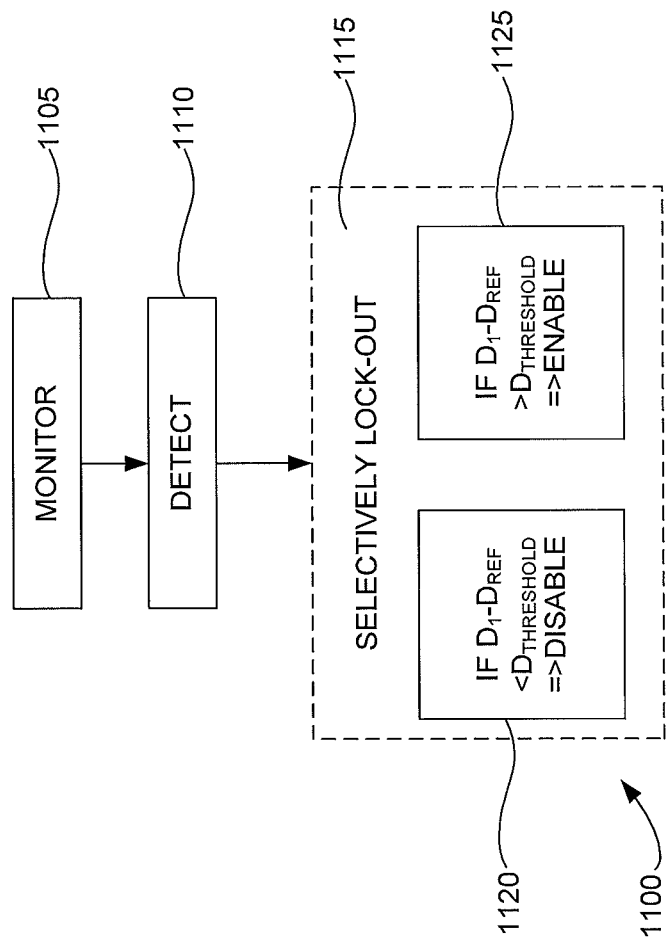
FIG. 11 illustrates a flow chart of a method of monitoring and detecting a location of a handheld mobile device within a vehicle based on a wireless signal metric associated with the handheld mobile device to automatically, selectively and temporarily disable or enable certain device functions on the handheld mobile device in accordance with an exemplary embodiment of the present invention.

FIG. 11 illustrates a flow chart of a method 1100 of monitoring and detecting a location of the handheld mobile device 15 within a vehicle based on the wireless signal metric (WSM) 35 associated with the handheld mobile device 15 to automatically, selectively and temporarily disable or enable certain device functions on the handheld mobile device 15 in accordance with an exemplary embodiment of the present invention. Reference is made to the elements and features described in FIGS. 1-10. It should be appreciated that some steps are not required to be performed in any particular order, and that some steps are optional.

The method 1100 of monitoring and detecting a location of the handheld mobile device 15 within a vehicle includes monitoring the wireless beacon 25 from the wireless station 20 at step 1105. In step 1110, the wireless signal metric (WSM) 35 associated with the handheld mobile device 15 may be detected. For example, the RSSI may be measured. The lock-out mechanism 45 is configured to selectively lock-out device functions of the handheld mobile device 15 in step 1115. More specifically, the lock-out mechanism 45 in step 1120 disables certain device functions of the handheld mobile device 15 based on: D1−Dref<Dthreshold=>DISABLE device. The lock-out mechanism 45 in step 1125 enables certain device functions of the handheld mobile device 15 based on: D1−Dref>Dthreshold=>ENABLE device.

Figure 12:
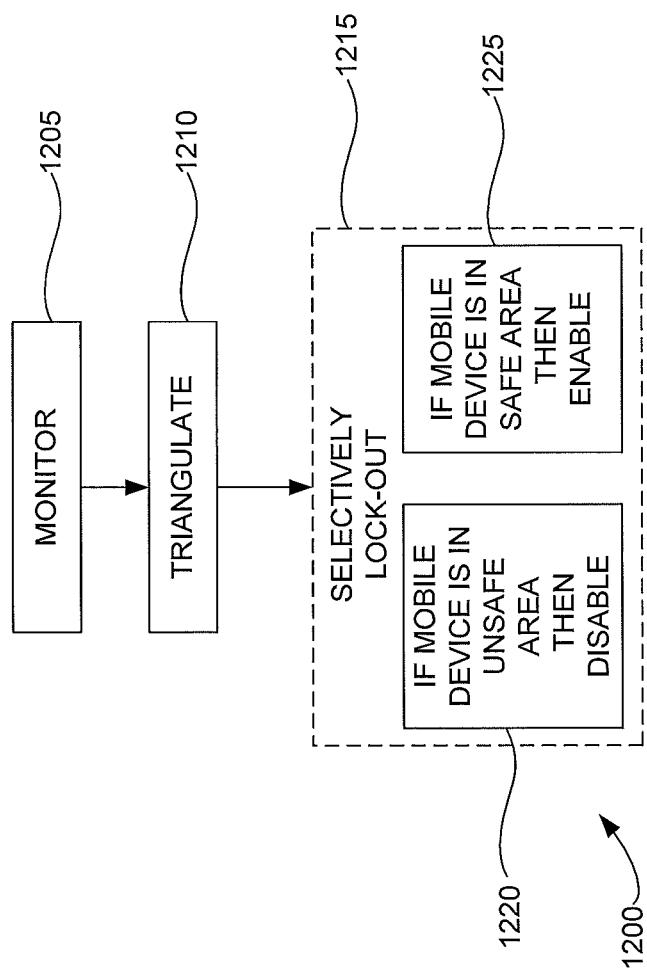
FIG. 12 illustrates a flow chart of a method of monitoring and triangulating a location of a handheld mobile device within a vehicle based on a wireless signal metric associated with the handheld mobile device to automatically, selectively and temporarily disable or enable certain device functions on the handheld mobile device in accordance with an exemplary embodiment of the present invention.

FIG. 12 illustrates a flow chart of a method '1200 of monitoring and triangulating a location of the handheld mobile device 15 within a vehicle based on the wireless signal metric (WSM) 35 associated with the handheld mobile device 15 to automatically, selectively and temporarily disable or enable certain device functions on the handheld mobile device 15 in accordance with an exemplary embodiment of the present invention. Reference is made to the elements and features described in FIGS. 1-10. It should be appreciated that some steps are not required to be performed in any particular order, and that some steps are optional.

The method 1200 of monitoring and triangulating a location of the handheld mobile device 15 within a vehicle includes monitoring the wireless beacon 25 from the wireless station 20 at step 1205. In step 1210, the wireless signal metric (WSM) 35 associated with the handheld mobile device 15 may be detected and location determined based on a triangulation technique. For example, the RSSI may be measured by multiple wireless stations 20. The lock-out mechanism 45 is configured to selectively lock-out device functions of the handheld mobile device 15 in step 1215. More specifically, the lock-out mechanism 45 in step 1220 disables certain device functions of the handheld mobile device 15 if the handheld mobile device 15 is found in the unsafe operating area 720. The lock-out mechanism 45 in step 1225 enables certain device functions of the handheld mobile device 15 is found in the safe operating area 705.

Figure 13:
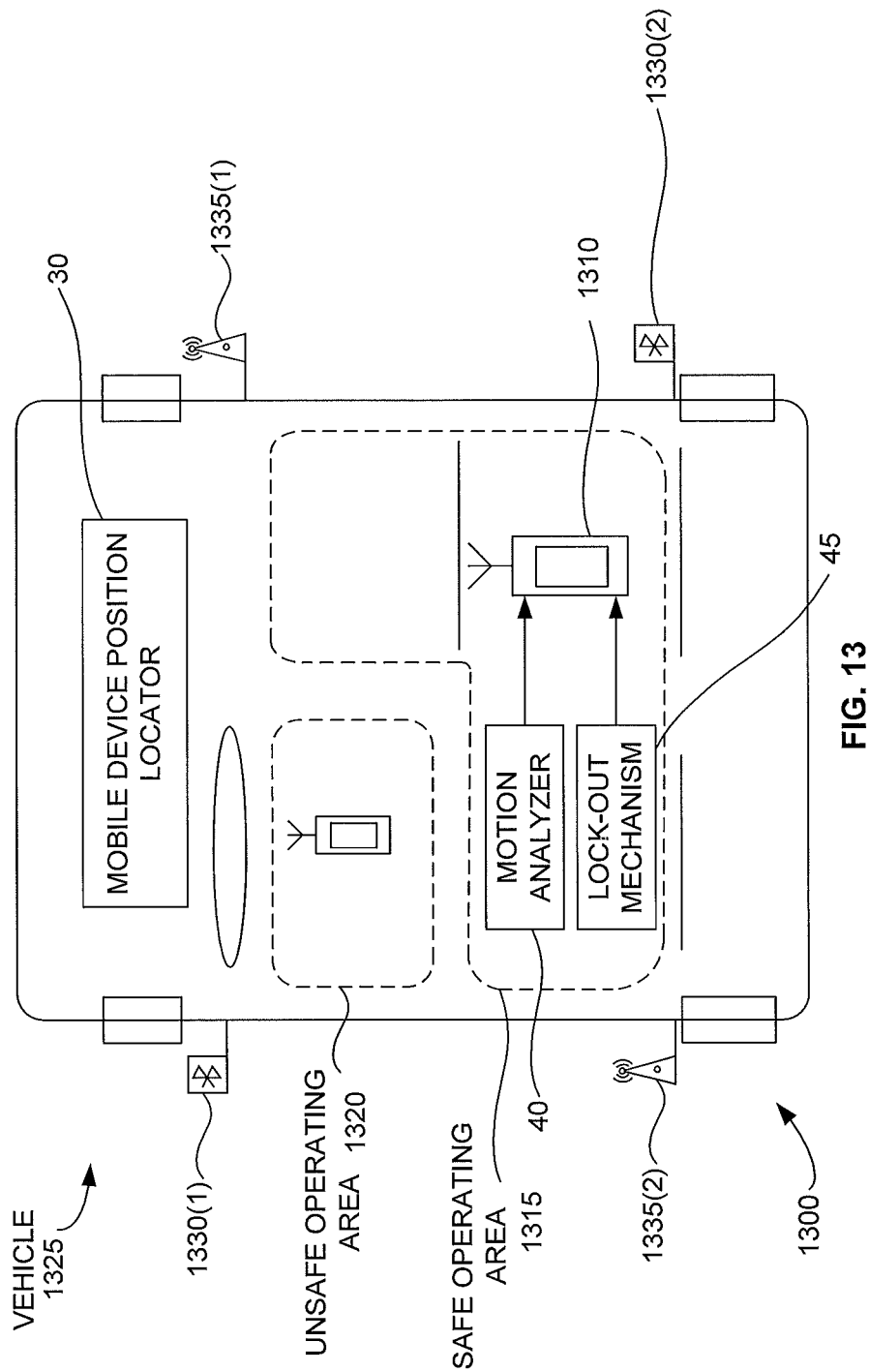
FIG. 13 illustrates a schematic of a hybrid short-range wireless, e.g., Bluetooth and/or WiFi-based WLAN system including a mobile device position locator configured to determine whether a handheld mobile device is located within a safe operating area or an unsafe operating area of a vehicle based on a wireless signal metric associated with the handheld mobile device using a combination of a Bluetooth station and a WLAN station operating as access points in accordance with an exemplary embodiment of the present invention.

FIG. 13 illustrates a schematic of a hybrid short-range wireless, e.g., Bluetooth and/or WiFi-based WLAN system 1300 including a mobile device position locator 1305 configured to determine whether a handheld mobile device 1310 is located within a safe operating area 1315 or an unsafe operating area 1320 of a vehicle 1325 based on the wireless signal metric (WSM) 35 associated with the handheld mobile device 1310 using a combination of Bluetooth station(s) 1330(1-2) and WLAN station(s) 1335(1-2) operating as access points in accordance with an exemplary embodiment of the present invention.

In the embodiment illustrated in FIG. 13, vehicle 1325 depicts an automobile, the four horizontal lines depict the backs of seats in vehicle 1325, and the oval depicts a steering wheel. Unsafe operating area 1320 depicts the driver compartment area comprising interior vehicle space devoted to the driver of vehicle 1325. In this embodiment, the driver compartment area is considered unsafe for operating one or more functions of the handheld mobile device 1310 during operation of vehicle 1325. Safe operating area 1315 depicts the passenger compartment area comprising interior vehicle space devoted to passengers of vehicle 1325. In this embodiment, the passenger compartment area is considered safe for operating one or more functions of the handheld mobile device 1310 during operation of vehicle 1325. Embodiments of the invention are directed to disabling one of more functions of the handheld mobile device 1310 held by a user while the user is operating vehicle 1325 (e.g., driving the automobile), but enabling the functions of the handheld mobile device 1310 held by a user riding along in vehicle 1325 as a passenger.

It should be noted that the designation of a vehicle area as unsafe or safe for the purpose of operating one or more functions of the handheld computing device 15 may differ according to vehicle type and safety considerations, and is not limited to the designations described and illustrated herein.

Figure 14:
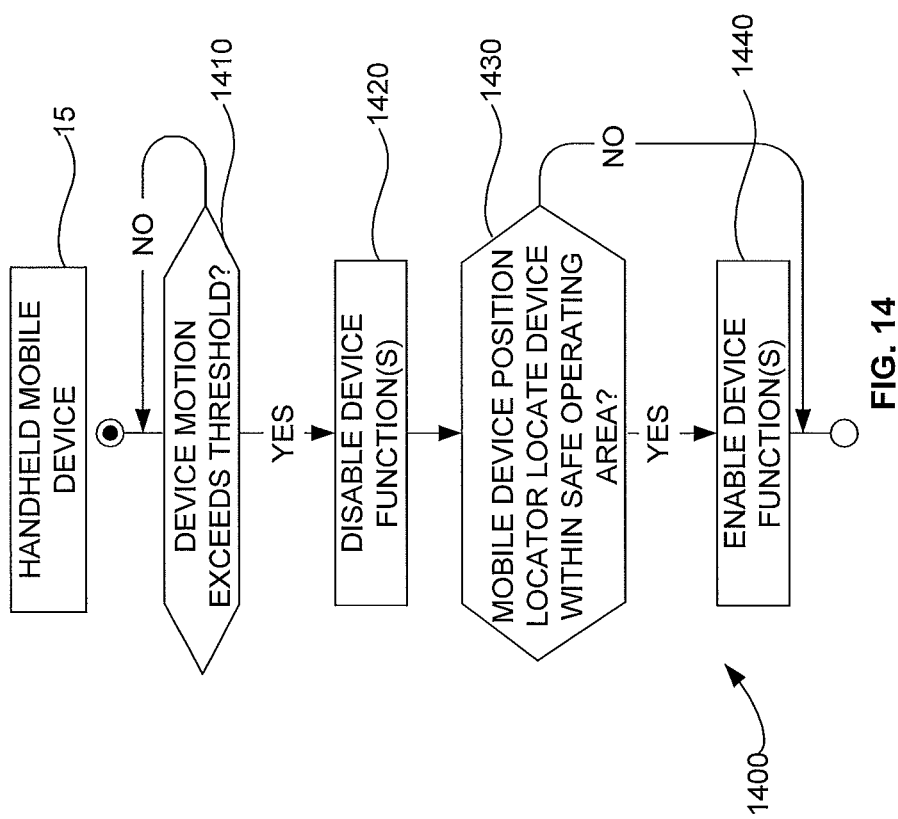
FIG. 14 illustrates a flow chart of a method in which a handheld mobile device may provide a lock-out mechanism according to one embodiment of the invention.

FIG. 14 illustrates a flow chart of a method 1400 in which the handheld mobile device 15 may provide the lock-out mechanism 45 according to one embodiment of the invention. FIG. 14 illustrates a process in which the handheld computing device 15 may provide a lock-out mechanism without requiring any modifications or additions to vehicle 1325. In particular, in the embodiment illustrated in FIG. 14, the handheld mobile device 15 may comprise a motion analyzer, a mobile device position locator and a lock-out mechanism. The motion analyzer can be configured to detect whether the handheld mobile device 15 is in motion beyond a predetermined threshold level (block 1410). The mobile device position locator can be configured to determine whether a holder of handheld computing device 200 is located within the safe operating area 1315 of vehicle 1325 (block 1430). The lock-out mechanism may be configured to disable (block 1420) one or more functions of the handheld computing device 15 based on output of the motion analyzer, and enable (block 1440) the one or more functions of the handheld computing device 15 based on output of the mobile device position locator.

For example, the lock-out mechanism may be configured to disable the one or more functions of the handheld computing device 15 when the output of the motion analyzer indicates that the handheld computing device 15 is in motion beyond a predetermined threshold level (e.g., speed). This may prevent the handheld mobile device 15 from being disabled when the user of the device is walking with the device rather than driving with it. And the lock-out mechanism may be configured to enable the one or more functions of the handheld mobile device 15 after output of the mobile device position locator indicates that the holder of the handheld mobile device 15 is within safe operating area 1315 of vehicle 1325. This can enables passengers in moving vehicles to operate the handheld mobile device 15 without one or more of its functions being disabled.

In one embodiment, the lock-out mechanism may be configured to enable the one or more functions of the handheld mobile device 15 for a predetermined period of time. In another embodiment, the lock-out mechanism may be configured to enable the one or more functions of the handheld mobile device 15 for a predetermined number of operations associated with the one or more functions of the handheld mobile device 15 (e.g., the sending or receiving of a predetermined number or text messages).

The motion analyzer may utilize any suitable mechanism to detect whether the handheld mobile device 15 is in motion, such as GPS data and/or cellular telephone signals (e.g., based on changing base station signals and/or signal strength). If the handheld mobile device 15 has an accelerometer, accelerometer motion based on output of the accelerometer can be used to detect whether the handheld mobile device 15 is in motion. If the handheld mobile device 15 has a light sensor, changing light conditions based on output of the light sensor can be used to detect whether handheld mobile device 15 is in motion.

Figure 15:
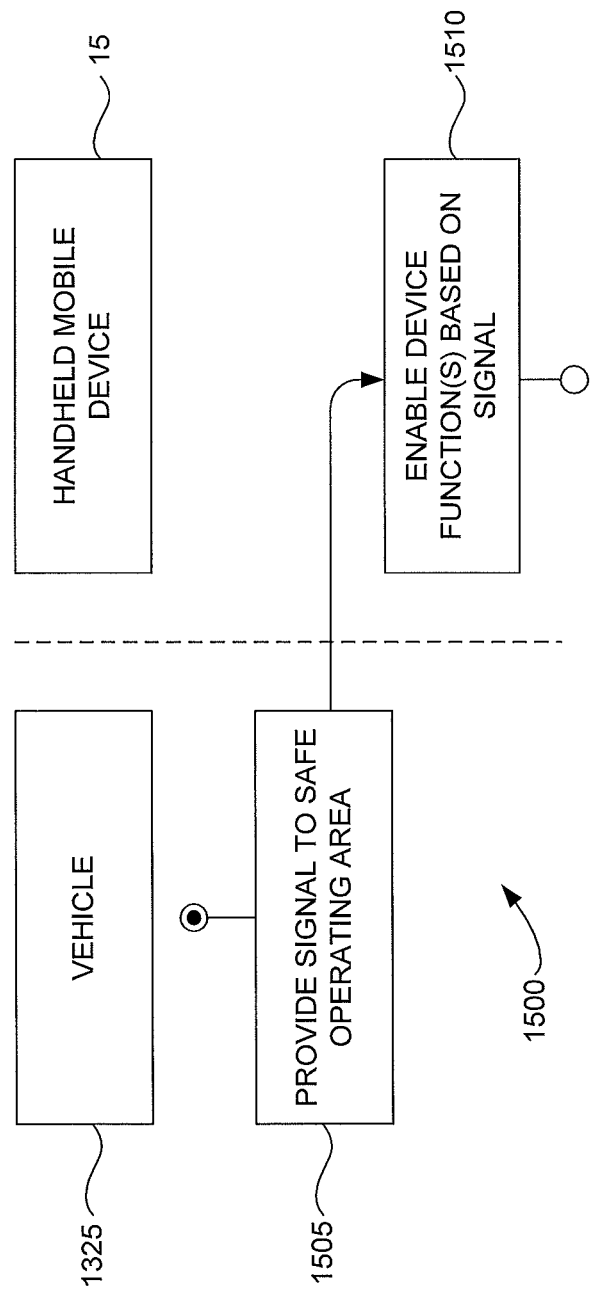
FIG. 15 illustrates a flow chart of a method in which a vehicle and a handheld mobile device may provide a lock-out mechanism according to one embodiment of the invention.
Figure 16:
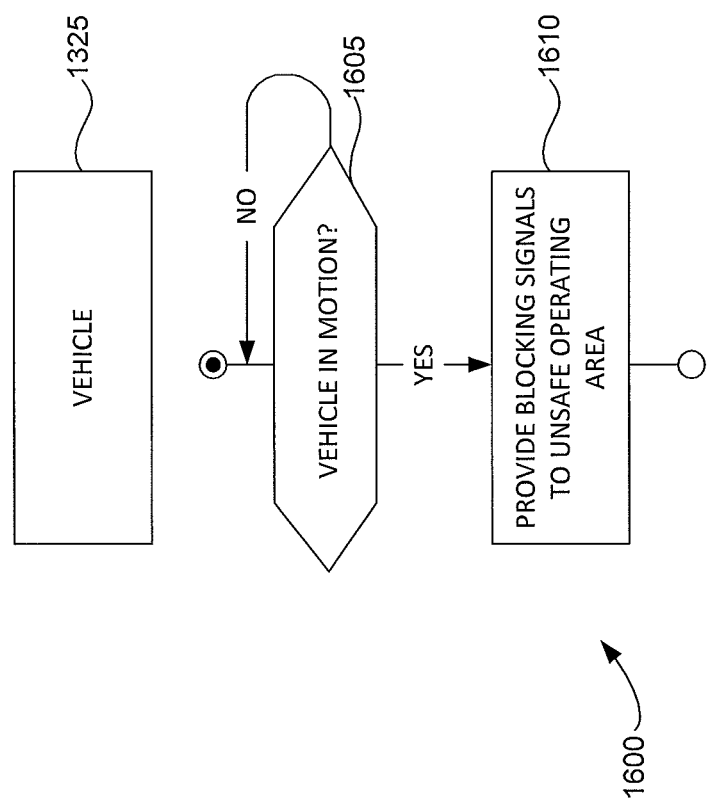
FIG. 16 illustrates a flow chart of a method in which a vehicle may provide a lock-out mechanism according to one embodiment of the invention.
Figure 17:
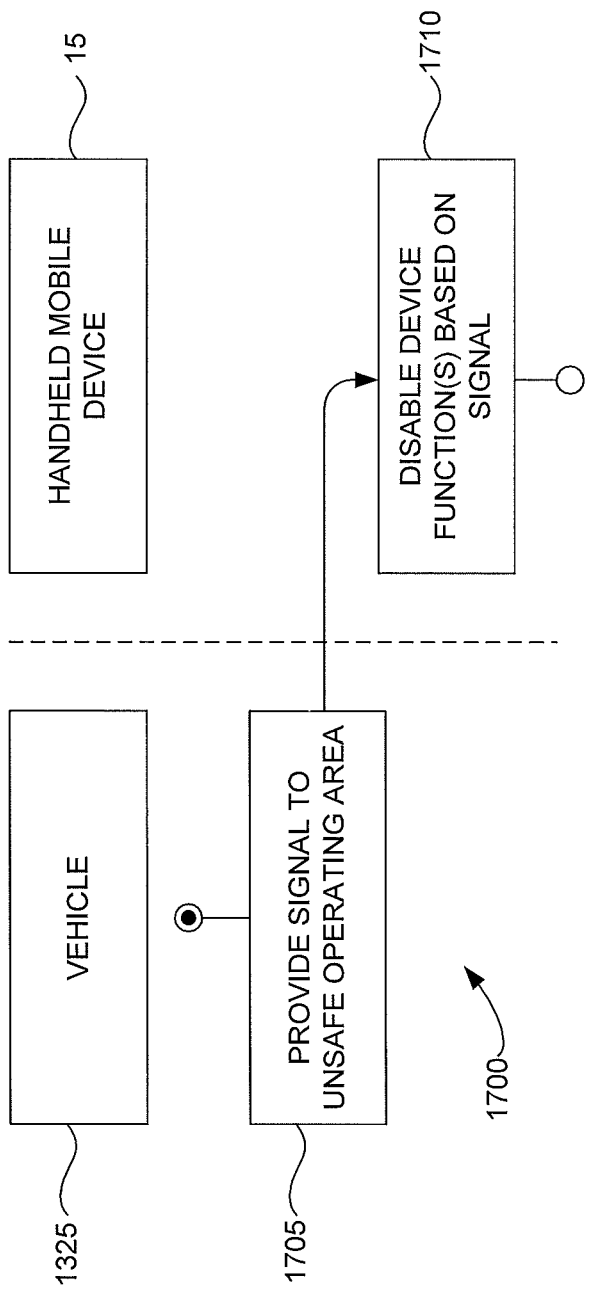
FIG. 17 illustrates a flow chart of a method in which a vehicle and a handheld mobile device can provide a lock-out mechanism according to another embodiment of the invention.

FIG. 15 illustrates a flow chart of a method 1500 in which the vehicle 1325 and the handheld mobile device 15 may provide the lock-out mechanism 45 according to one embodiment of the invention. FIGS. 15-17 illustrate processes in which the handheld mobile device 15 can provide a lock-out mechanism with modifications or additions to vehicle 1325. FIG. 15, for example, illustrates a process in which vehicle 1325 and the handheld mobile device 15 can provide a lock-out mechanism in which vehicle 1325 may cause disabled functionality of the handheld mobile device 15 (e.g., due to motion of the handheld mobile device 15) to be enabled. In this process, vehicle 1325 may include a transmitter configured to provide a signal to the safe operating area 1315 (block 1505). The handheld mobile device 15 may be configured to enable one or more of its functions (e.g., a text messaging function) based on the signal (block 1510). The transmitter may be located in any suitable location in vehicle 1325 as long as the transmission signal only reaches the safe operating area 1315 and not the unsafe operating area 1320. In this embodiment, the transmission signal may be used to verify that the holder of the handheld mobile device 15 is within the safe operating area 1315 when in motion beyond a predetermined threshold level.

FIG. 16 illustrates a flow chart of a method 1600 in which the vehicle 1325 may provide the lock-out mechanism 45 according to one embodiment of the invention. FIG. 16 illustrates a process in which the vehicle 1325 may unilaterally provide a lock-out mechanism. For example, vehicle 1325 can include a transmitter configured to provide one or more radio frequency blocking signals to the unsafe operating area 1325 of vehicle 1325 (block 1610) when vehicle 1325 determines that it is in motion (e.g., being driven) (block 1605). The blocking signals may be tuned to the frequencies utilized by the handheld mobile device 15 for operating a function intended to be disabled by the lock-out mechanism (e.g., such as sending or receiving cellular phone calls or text messages). The transmitter can be located in any suitable location in vehicle 1325 as long as the blocking signals only reach the unsafe operating area 1320 and not the safe operating area 1315. In this manner, the handheld mobile device 15 need not be altered or modified to have its functionality disabled when in motion in the vehicle 1325. The vehicle 1325 may initiate the blocking signals whenever it detects itself in motion, for example.

FIG. 17 illustrates a flow chart of a method 1700 in which the vehicle 1325 and the handheld mobile device 15 may provide the lock-out mechanism 45 according to another embodiment of the invention. FIG. 17 illustrates a process in which the vehicle 1325 and the handheld mobile device 15 may provide a lock-out mechanism in which the vehicle 1325 may cause functionality of the handheld mobile device 15 to be disabled in coordination with the handheld mobile device 15. In this process, vehicle 100 can include a transmitter configured to provide a signal (block 1705), and the handheld mobile device 15 may comprise a receiver configured to disable one or more of its functions based on the signal (block 1710). In one embodiment, vehicle 1325 can be configured to detect whether the handheld mobile device 15 is in proximity to vehicle 1325, and provide the signal to the handheld mobile device 15 when vehicle 1325 detects handheld computing device 200 is in proximity to vehicle 1325. Vehicle 1325 may detect the proximity of the handheld mobile device 15 in any suitable way, such as via radio frequency identification (RFID), for example, wherein the handheld mobile device 15 is provided with an RFID tag.

The handheld mobile device 15 may be any of a variety of types such as those illustrated in FIG. 1, for example, a PDA or a mobile telephone or a tablet that may provide a lock-out mechanism according to an embodiment of the invention. Additionally, the handheld mobile device 15 may be a combination of these types. For example, in one embodiment the handheld mobile device 15 may be a device that is a combination of PDA and a mobile telephone. The PDA and mobile telephone may prevent the dangerous practice of operating a handheld computing device in certain ways while driving by providing a lock-out mechanism according to embodiments of the invention.

The techniques described herein can be particularly useful for using a short-range wireless, e.g., Bluetooth and/or WiFi-based WLAN system. While particular embodiments are described in terms of Bluetooth and/or WiFi, the techniques described herein are not limited to Bluetooth and/or WiFi but can also use other software and hardware such as NFC or other smart automotive interactive communication modules.

For example, the vehicle 1325 may be equipped with an Onboard Unit (OBU) which may completely or partially implement the short-range wireless, e.g., Bluetooth and/or WiFi-based WLAN system. As used herein, "a vehicle V equipped with an Onboard Unit (OBU)" refers to a vehicle that connects to sensors, decision-making systems and control systems for enabling a safety system for connected and unconnected vehicles. The "short-range wireless, e.g., Bluetooth and/or WiFi-based WLAN system," in addition to the exemplary hardware description above, refers to a system that is configured to provide communications for creating an ecosystem of a connected vehicle, operated by a controller. The short-range wireless, e.g., Bluetooth and/or WiFi-based WLAN system can include multiple interacting systems, whether located together or apart, that together perform processes as described herein.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes,", "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only; various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A handheld mobile device comprising: a motion analyzer device configured to detect whether the handheld mobile device is in motion beyond a predetermined threshold level; a mobile device position locator configured to wirelessly determine whether the handheld mobile device is located within a safe operating area of a vehicle based on location data of the handheld mobile device determined from a wireless signal associated with the handheld mobile device; and a lock-out mechanism device configured to automatically and selectively disable one or more functions of the handheld mobile device based on outputs from the motion analyzer device and the mobile device position locator, wherein the mobile device position locator is configured to create a mapping of a vehicle interior room and measure a wireless signal metric data across the vehicle interior room in a training phase for creating a wireless signal metric-to-distance mapping such that a wireless signal metric value is used to indicate a distance (D) in the vehicle interior room, and wherein the mobile device position locator is configured to map the wireless signal metric value of a wireless beacon from a surrounding access point to the distance (D) of the handheld mobile device to the surrounding access point based on the wireless signal metric-to-distance mapping to extract the location data of the handheld mobile device.

2. The handheld mobile device of claim 1, wherein the lock-out mechanism device is configured to disable the one or more functions of the handheld mobile device when the output of the motion analyzer device indicates that the handheld mobile device is in motion beyond the predetermined threshold level.

3. The handheld mobile device of claim 2, wherein the lock-out mechanism device is configured to enable the one or more functions of the handheld mobile device after output of the mobile device position locator indicates that the holder of the handheld mobile device is located within the safe operating area of the vehicle.

4. The handheld mobile device of claim 3, wherein the lock-out mechanism device is configured to enable the one or more functions of the handheld mobile device for a predetermined period of time.

5. The handheld mobile device of claim 3, wherein the lock-out mechanism device is configured to enable the one or more functions of the handheld mobile device for a predetermined number of operations associated with the one or more functions of the handheld mobile device.

6. The handheld mobile device of claim 1, wherein the motion analyzer device is configured to detect whether the handheld mobile device is in motion based on GPS data.

7. The handheld mobile device of claim 1, wherein the motion analyzer device is configured to detect whether the handheld mobile device is in motion based on cellular telephone signals.

8. The handheld mobile device of claim 1, further comprising: an accelerometer, and the motion analyzer device is configured to detect whether the handheld mobile device is in motion based on output of the accelerometer.

9. The handheld mobile device of claim 1, wherein the mobile device position locator further comprises a wireless triangulator, the wireless triangulator is configured to dynamically measure and report a distance of the handheld mobile device to a surrounding access point based on a triangulation technique using multiple surrounding wireless stations.

10. The handheld mobile device of claim 1, wherein the one or more functions of the handheld mobile device includes a text messaging function.

11. A method comprising: detecting using a handheld mobile device whether the handheld mobile device is in motion beyond a predetermined threshold level; determining using the handheld mobile device whether the handheld mobile device is located within a safe operating area of a vehicle based on location data of the handheld mobile device determined from a wireless signal associated with the handheld mobile device; creating a mapping of a vehicle interior room and measuring a wireless signal metric data across the vehicle interior room in a training phase for creating a wireless signal metric-to-distance mapping such that a wireless signal metric value is used to indicate a distance (D) in the vehicle interior room; mapping the wireless signal metric value of a wireless beacon from a surrounding access point to the distance (D) of the handheld mobile device to the surrounding access point based on the wireless signal metric-to-distance mapping to extract the location data of the handheld mobile device; and automatically and selectively disabling using the handheld mobile device one or more functions of the handheld mobile device when both the handheld mobile device is detected to be in motion beyond the predetermined threshold level and the handheld mobile device is determined not to be located within the safe operating area of the vehicle.

12. The method of claim 11, wherein the one or more functions are configured to be enabled for a predetermined period of time.

13. The method of claim 11, wherein the one or more functions are configured to be enabled for a predetermined number of operations associated with the one or more functions of the handheld mobile device.

14. The method of claim 11, wherein the one or more functions of the handheld mobile device includes a text messaging function.

15. A wireless in-vehicle mobile device positioning and location system comprising: a motion analyzer device configured to detect whether the handheld mobile device is in motion beyond a predetermined threshold level; a mobile device position locator configured to wirelessly determine whether the handheld mobile device is located within a safe operating area or an unsafe operating area of a vehicle based on location data of the handheld mobile device determined from a wireless signal associated with the handheld mobile device; and a lock-out mechanism device configured to automatically and selectively disable one or more functions of the handheld mobile device if determined to be in the unsafe operating area or enable the one or more functions of the handheld mobile device if determined to be in the safe operating area based on outputs from the motion analyzer device and the mobile device position locator, wherein the mobile device position locator is configured to create a mapping of a vehicle interior room and measure a wireless signal metric data across the vehicle interior room in a training phase for creating a wireless signal metric-to-distance mapping such that a wireless signal metric value is used to indicate a distance (D) in the vehicle interior room, and wherein the mobile device position locator is configured to map the wireless signal metric value of a wireless beacon from a surrounding access point to the distance (D) of the handheld mobile device to the surrounding access point based on the wireless signal metric-to-distance mapping to extract the location data of the handheld mobile device.

16. The system of claim 15, wherein the lock-out mechanism device is configured to disable the one or more functions of the handheld mobile device when the output of the motion analyzer device indicates that the handheld mobile device is in motion beyond the predetermined threshold level.

17. The system of claim 16, wherein the mobile device position locator is based on at least one of a short-range wireless, e.g., a Bluetooth protocol and a WiFi-based WLAN protocol.

18. The system of claim 15, wherein the wireless signal metric is at least one of metric a Radio Signal Strength Indicator (RSSI), a received bit error rate (BER) and a signal quality (SQ) associated with the handheld mobile device.

19. The system of claim 15, wherein the mobile device position locator further comprises a wireless triangulator, the wireless triangulator is configured to dynamically measure and report a distance of the handheld mobile device to a surrounding access point based on a triangulation technique using multiple surrounding wireless stations.

* * * * *